United States Patent
Plamondon (10) Patent No.: US 12,078,353 B2
(45) Date of Patent: Sep. 3, 2024

(54) AIRCRAFT POWER PLANT WITH INTERBURNER

(71) Applicant: PRATT & WHITNEY CANADA CORP., Longueuil (CA)

(72) Inventor: Etienne Plamondon, Verdun (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 18/058,755

(22) Filed: Nov. 24, 2022

(65) Prior Publication Data
US 2024/0175580 A1 May 30, 2024

(51) Int. Cl.
| | |
|---|---|
| F23R 3/16 | (2006.01) |
| B64D 27/10 | (2006.01) |
| B64D 31/00 | (2006.01) |
| B64D 33/02 | (2006.01) |
| F02C 3/04 | (2006.01) |

(52) U.S. Cl.
CPC .......... *F23R 3/16* (2013.01); *B64D 27/10* (2013.01); *B64D 31/00* (2013.01); *B64D 33/02* (2013.01); *F02C 3/04* (2013.01)

(58) Field of Classification Search
CPC ...... F23R 3/16; F23R 3/28; F23R 3/34; F23R 3/346; B64D 27/10; B64D 31/00; B64D 33/02; F02C 3/04; F02C 7/26; F02C 7/264; F02D 41/0007; F02D 25/00; F02D 43/00; F02B 37/166; F02B 37/20; F02B 73/00
See application file for complete search history.

(56) References Cited

U.S. PATENT DOCUMENTS

| | | | |
|---|---|---|---|
| 7,753,036 B2 | 7/2010 | Ents et al. | |
| 7,775,044 B2 | 8/2010 | Julien et al. | |
| 9,976,744 B2 | 5/2018 | Wood et al. | |
| 10,774,740 B2 | 9/2020 | Marmilic et al. | |
| 11,215,110 B2 | 1/2022 | Thomassin et al. | |
| 2014/0130508 A1* | 5/2014 | Brooks | F02B 43/10 60/39.5 |
| 2015/0275749 A1 | 10/2015 | Thomassin | |
| 2015/0275756 A1 | 10/2015 | Bolduc et al. | |

FOREIGN PATENT DOCUMENTS

JP 2002004904 A * 1/2002 .............. F02B 37/12

* cited by examiner

*Primary Examiner* — Loren C Edwards
(74) *Attorney, Agent, or Firm* — NORTON ROSE FULBRIGHT CANADA LLP (57) ABSTRACT

A method of operating an aircraft power plant having an interburner fluidly connected between a combustion engine and a turbine, includes: operating the combustion engine at an air-fuel ratio corresponding to a nominal air-fuel ratio to generate combustion gases; receiving the combustion gases generated by the combustion engine into the interburner; increasing a temperature of the combustion gases generated by a combustion chamber of the combustion engine by lowering the air-fuel ratio to an ignition air-fuel ratio lower than the nominal air-fuel ratio; injecting fuel into the interburner to cause ignition of a mixture of the combustion gases and the fuel received into the interburner; and after ignition of the interburner, increasing the air-fuel ratio above the ignition air-fuel ratio.

19 Claims, 6 Drawing Sheets

AIRCRAFT POWER PLANT WITH INTERBURNER

TECHNICAL FIELD

The application relates generally to aircraft engines and, more particularly, to interburner used in such engines.

BACKGROUND

In aircraft applications, the power output capacity of an engine relative to the weight of the engine is an important factor that may affect an overall efficiency of the aircraft since the weight of the engine must be carried by the aircraft during flight. Aircraft engines may be required to have a maximum power output rating that can be produced during short-term (i.e., momentary) peak power operation in situations such as during take-off or during emergency situations. Even though, the long-term continuous operation of the aircraft engines during a cruise phase of flight, for example, can be well below such maximum power output rating, the maximum power output rating can necessitate increased size and weight of aircraft engines. Improvements are desirable.

SUMMARY

In one aspect, there is provided a method of operating an aircraft power plant having an interburner fluidly connected between a combustion engine and a turbine, comprising: operating the combustion engine at an air-fuel ratio corresponding to a nominal air-fuel ratio to generate combustion gases; receiving the combustion gases generated by the combustion engine into the interburner; increasing a temperature of the combustion gases generated by a combustion chamber of the combustion engine by lowering the air-fuel ratio to an ignition air-fuel ratio lower than the nominal air-fuel ratio; injecting fuel into the interburner to cause ignition of a mixture of the combustion gases and the fuel received into the interburner; and after ignition of the interburner, increasing the air-fuel ratio above the ignition air-fuel ratio.

The method described above may include any of the following features, in any combinations.

In some embodiments, the lowering of the air-fuel ratio includes increasing a mass flow rate of a fuel supplied to the combustion engine.

In some embodiments, the lowering of the air-fuel ratio includes decreasing a mass flow rate of air supplied to the combustion engine.

In some embodiments, the operating of the combustion engine includes supplying air to the combustion engine via a compressor.

In some embodiments, the decreasing of the mass flow rate of the air includes bleeding compressed air out of the compressor.

In some embodiments, the decreasing of the mass flow rate of the air includes changing an angle of attack of guide vanes of the compressor.

In some embodiments, the decreasing of the mass flow rate of the air includes decreasing a speed of rotation of a rotor of the compressor.

In some embodiments, the increasing of the air-fuel ratio includes resuming operating the combustion engine back to the nominal air-fuel ratio.

In some embodiments, the air-fuel ratio is an air-fuel equivalence ratio (D).

In another aspect, there is provided a method of igniting an interburner of an aircraft power plant without an igniter, the interburner fluidly connected between a combustion engine and a turbine of the aircraft power plant, comprising: injecting combustion gases generated by the combustion engine operated at a first air-fuel ratio into the interburner; causing an increase in a temperature of the combustion gases exiting the combustion engine and received into the interburner by operating the combustion engine at a second air-fuel ratio being lower than the first air-fuel ratio; and injecting fuel into the interburner to cause ignition of a mixture of the fuel and the combustion gases.

The method described above may include any of the following features, in any combinations.

In some embodiments, the operating of the combustion engine at the second air-fuel ratio includes one or more of increasing a mass flow rate of a fuel to the combustion engine and decreasing a mass flow rate of air to the combustion engine.

In some embodiments, the method includes supplying air to the combustion engine via a compressor.

In some embodiments, the decreasing of the mass flow rate of the air includes bleeding compressed air out of the compressor.

In some embodiments, the decreasing of the mass flow rate of the air includes changing an angle of attack of guide vanes of the compressor.

In some embodiments, the decreasing of the mass flow rate of the air includes decreasing a speed of rotation of a rotor of the compressor.

In yet another aspect, there is provided an aircraft power plant, comprising: a combustion engine; a turbine; an interburner having an interburner inlet fluidly connected to an exhaust of the combustion engine and an interburner outlet fluidly connected to a turbine inlet of the turbine; a fuel injector fluidly connected to the interburner; and a controller operatively connected to the combustion engine and to the fuel injector, the controller configured to: operate the combustion engine at an air-fuel ratio corresponding to a nominal air-fuel ratio to generate combustion gases; in response to receiving of a command, lower an air-fuel ratio of the combustion engine to increase a temperature of the combustion gases exiting a combustion chamber the combustion engine and received within the interburner; inject fuel into the interburner to cause ignition of a mixture of the combustion gases and the fuel received into the interburner; and after ignition of the interburner, increase the air-fuel ratio.

The aircraft power plant described above may include any of the following features, in any combinations.

In some embodiments, the controller is configured to lower the air-fuel ratio by one or more of increasing a mass flow rate of a fuel supplied to the combustion engine and decreasing a mass flow rate of air supplied to the combustion engine.

In some embodiments, a compressor fluidly is connected to the combustion engine, the controller configured to lower the air-fuel ratio by one or more of: decreasing the mass flow rate of the air by bleeding compressed air out of the compressor, decreasing the mass flow rate of the air by changing an angle of attack of guide vanes of the compressor, and decreasing the mass flow rate of the air by decreasing a speed of rotation of a rotor of the compressor.

In some embodiments, the controller is configured to receive the command by receiving a signal from a switch operatively connected to a controller, the controller operatively connected to the aircraft power plant.

In some embodiments, the controller is configured to receive the command by receiving a signal from a power lever of the aircraft power plant, the signal indicative that a power requirement of the aircraft power plant is above a power threshold of the aircraft power plant when the interburner is turned off.

BRIEF DESCRIPTION OF THE DRAWINGS

Reference is now made to the accompanying figures in which.

DETAILED DESCRIPTION

Figure 1:
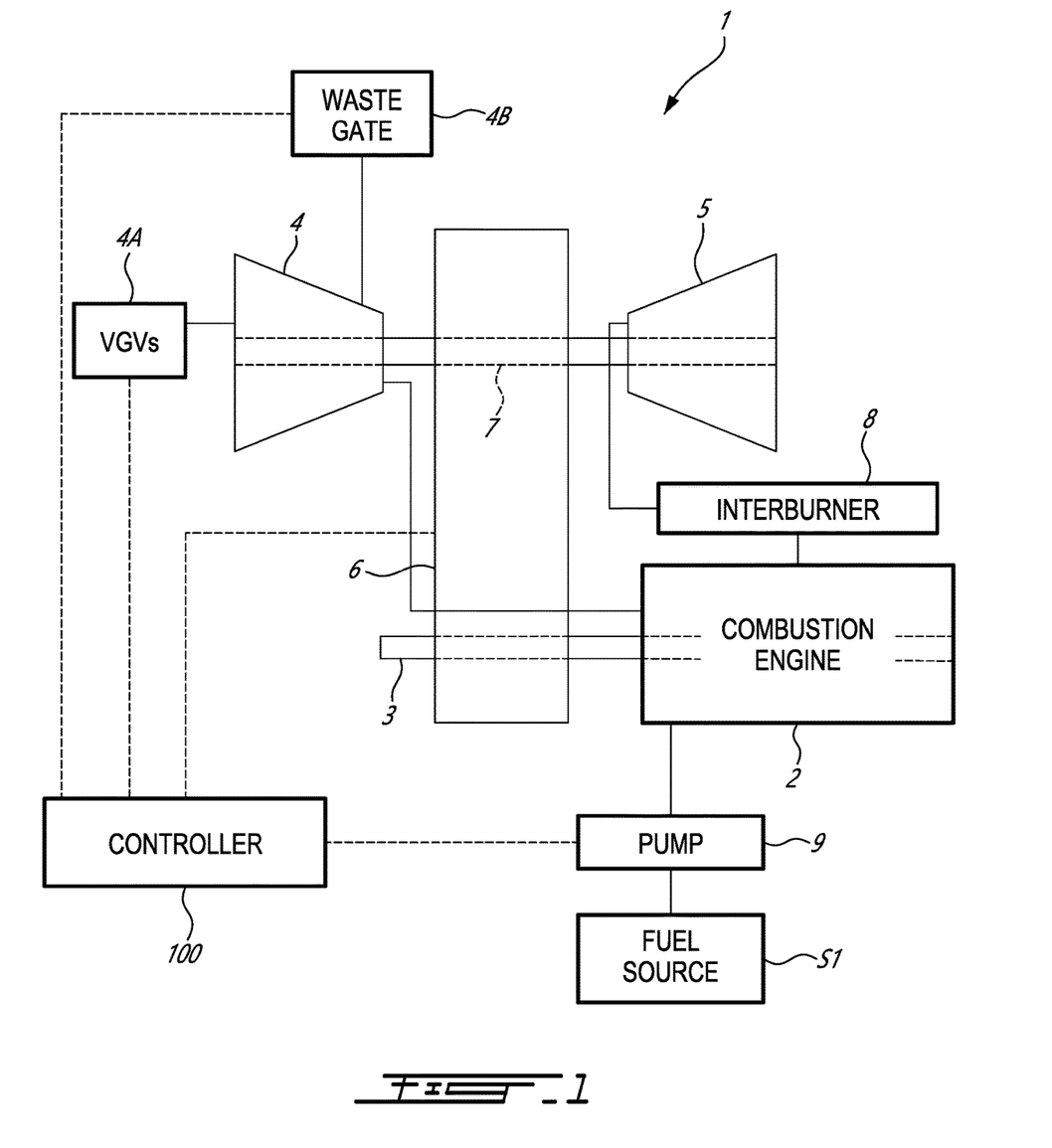
FIG. 1 is a schematic view of an aircraft power plant in accordance with one embodiment.

Referring to FIG. 1, an aircraft power plant 1 is generally shown and includes an internal combustion engine, referred to be below as a combustion engine 2 or as a thermal engine. In a particular embodiment, the combustion engine 2 comprises one or more rotary units each configured for example as a Wankel engine, or one or more reciprocating pistons. The combustion engine 2 drives a shaft 3, which may be referred to as an output shaft, that is used for driving a rotatable load (not shown). It is understood that the aircraft power plant 1 may alternatively be configured to drive any other appropriate type of load, including, but not limited to, one or more generator(s), propeller(s), accessory(ies), rotor mast(s), compressor(s), or any other appropriate type of load or combination thereof. In a particular embodiment, the combustion engine 2 is a rotary engine as will be described below. The combustion engine 2 may be a rotary engine or a piston engine. Any engine having a combustion chamber of varying volume may be used.

In a particular embodiment, the aircraft power plant 1 is a compound cycle engine system or compound cycle engine such as described in Lents et al.'s U.S. Pat. No. 7,753,036 issued Jul. 13, 2010 or as described in Julien et al.'s U.S. Pat. No. 7,775,044 issued Aug. 17, 2010, or as described in Thomassin et al.'s U.S. patent publication No. 2015/0275749 published Oct. 1, 2015, or as described in Bolduc et al.'s U.S. patent publication No. 2015/0275756 published Oct. 1, 2015, the entire contents of all of which are incorporated by reference herein. The aircraft power plant 1 may be used as a prime mover engine, such as on an aircraft or other vehicle, or in any other suitable application.

In the embodiment shown, the aircraft power plant 1 includes a compressor 4 for compressing the air before it is fed to an air inlet of the combustion engine 2, and a turbine 5 receiving the combustion gases from the combustion engine 2. It is understood that variations are possible, and that, for example, the compressor 4 may be omitted. The compressor 4 and the turbine 5 may each comprise one or more turbine stages, each including a rotor and a stator. The compressor 4 may be an axial compressor or a radial compressor. The turbine 5 may be an axial turbine or a radial turbine. Any suitable configurations are contemplated.

In the illustrated embodiment, the combustion engine 2, the compressor 4, and the turbine 5 are in driving engagement with a gearbox 6. The gearbox 6 is configured to allow the turbine 5 to compound power with the shaft 3 of the combustion engine 2 and to allow the turbine 5 and/or the combustion engine 2 to drive the compressor 4.

In the illustrated embodiment, the compressor 4 and the turbine 5 are in a driving engagement with the gearbox 6. In the illustrated embodiment, compressor and turbine rotors are engaged to a same turbine shaft 7, which is drivingly engaged to the shaft 3 of the combustion engine 2 through the gearbox 6. Herein, the turbine shaft 7 and the shaft 3 are parallel and radially offset from one another. However, alternate configurations are possible, including, but not limited to, the rotor(s) of the compressor 4 being engaged to a shaft separate from the turbine shaft 7 (whether coaxial with the turbine shaft 7, with the shaft 3, or offset from both) and in driving engagement with the turbine shaft 7 and/or the shaft 3, for example through the gearbox 6; and/or two or more of the shafts extending at an angle (perpendicularly or otherwise) to each other. Any suitable configurations are contemplated.

In the illustrated embodiment, an exhaust of the combustion engine 2 (corresponding to or communicating with an exhaust port of a respective rotary engines/reciprocating pistons of the combustion engine 2) is in fluid communication with the turbine 5 through an interburner 8. The interburner 8 is configured to increase a temperature of the exhaust gases such that more power can be extracted by the turbine 5 and thus transferred to the shaft 3 via the gearbox 6. The interburner 8 is described below in greater detail with reference to FIG. 3.

In the embodiment shown, the combustion engine 2 is fluidly connected to a fuel source S1 through a pump 9, which may be operatively connected to a controller 100. The controller 100 may power the pump 9 to vary a mass flow rate of fuel supplied form the fuel source S1 to the combustion engine 2. It will be appreciated that other components, such as pressure regulating valve, and so on may be present even if not illustrated in FIG. 1. The pump 9 may be a gear pump and may be operated at a plurality of speeds each corresponding to a respective mass flow rate of fuel.

The compressor 4 may include variable guide vanes (VGVs) 4A pivotable about respective spanwise axes and controllable to change a flow of air through the compressor 4. In the embodiment shown, the VGVs 4A are variable inlet guide vanes since they are located upstream of an upstreammost of the rotor(s) of the compressor 4. However, the VGVs may be located at any suitable location within the compressor 4. The controller 100 may be operatively connected to an actuator drivingly engaged to the VGVs 4A to pivot the VGVs 4A. In some embodiments, the VGVs 4A may be omitted.

Still referring to FIG. 1, a blow off valve 4B may be operatively connected to the compressor 4. The blow off valve 4B may be an actuated valve (e.g., servo valve) operatively connected to the controller 100. The blow off valve 4B may be used to bleed air out of the compressor 4. The blow off valve 4B may be fluidly connected at any suitable locations on the compressor 4. In some embodiments, a waste gate on the exhaust side may also be used for that purpose.

Figure 2:
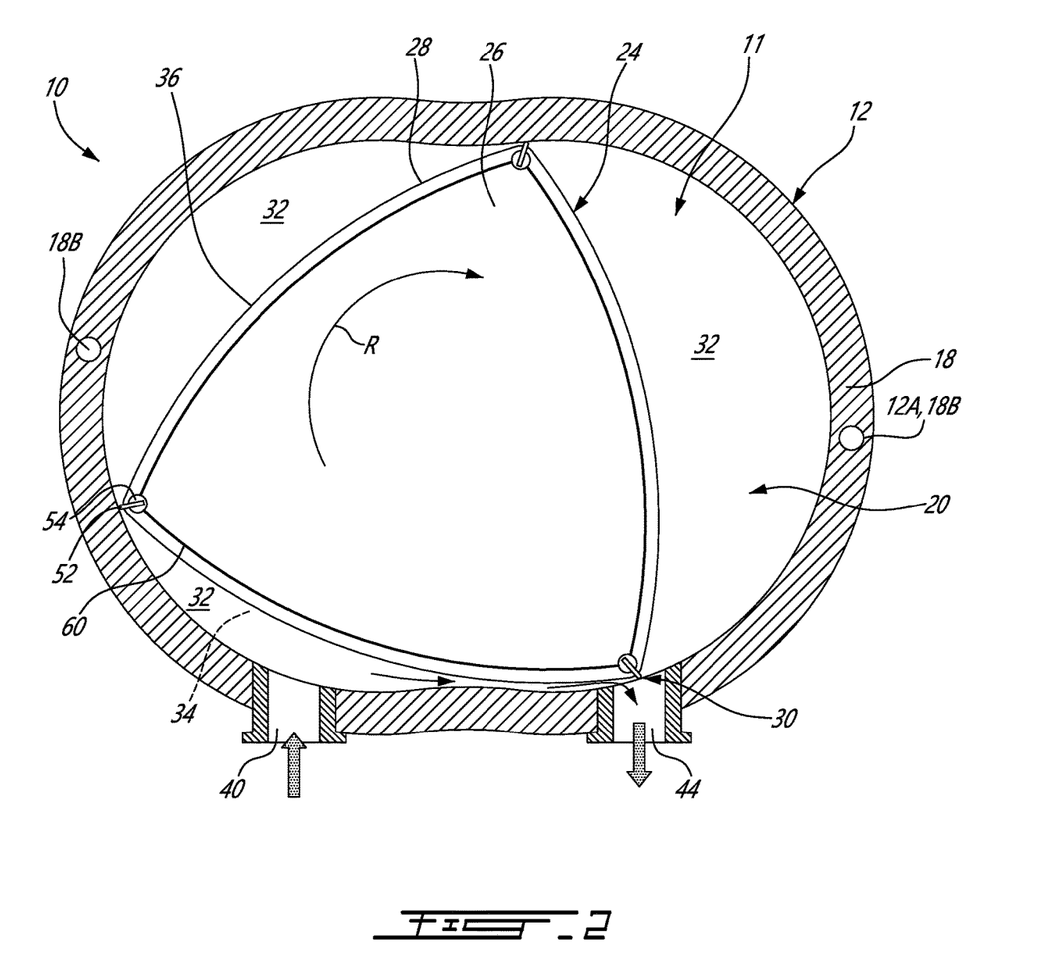
FIG. 2 is a schematic cross-sectional view of a rotary internal combustion engine in accordance with one embodiment that may be used as part of the aircraft power plant of FIG. 1.

Referring now to FIG. 2, the combustion engine 2 may be a rotary internal combustion engine, referred to simply as a rotary engine 10 below, is illustrated. The rotary engine 10 may be a Wankel engine. The rotary engine 10 comprises an outer body 12 having axially-spaced side housings 11, with a peripheral wall 18 extending from one of the side housings 11 to the other, to form a rotor cavity 20. The inner surface of the peripheral wall 18 of the cavity 20 has a profile defining two lobes, which may be an epitrochoid.

The outer body 12 includes a coolant circuitry 12A, which may include a plurality of coolant conduits 18B defined within the peripheral wall 18. As shown more clearly in FIG. 5, the coolant conduits 18B extends from one of the side housings 11 to the other. The coolant circuitry 12A is used for circulating a coolant, such as water or any suitable coolant, to cool the outer body 12 during operation of the rotary engine 10. Although only two coolant conduits 18B are shown, it is understood that more than two coolant conduits 18B may be used without departing from the scope of the present disclosure.

An inner body or rotor 24 is received within the rotor cavity 20. The rotor 24 has axially spaced end faces 26 adjacent to the side housings 11, and a peripheral face 28 extending therebetween. The peripheral face 28 defines three circumferentially-spaced apex portions 30, and a generally triangular profile with outwardly arched sides 36. The apex portions 30 are in sealing engagement with the inner surface of peripheral wall 18 to form three rotating combustion chambers 32 between the rotor 24 and outer body 12. The geometrical axis of the rotor 24 is offset from and parallel to the axis of the outer body 12.

The combustion chambers 32 are sealed. In the embodiment shown, each rotor apex portion 30 has an apex seal 52 extending from one end face 26 to the other and biased radially outwardly against the peripheral wall 18. An end seal 54 engages each end of each apex seal 52 and is biased against the respective side housings 11. Each end face 26 of the rotor 24 has at least one arc-shaped face seal 60 running from each apex portion 30 to each adjacent apex portion 30, adjacent to but inwardly of the rotor periphery throughout its length, in sealing engagement with the end seal 54 adjacent each end thereof and biased into sealing engagement with the side housings 11. Alternate sealing arrangements are also possible.

Although not shown, the rotor 24 is journaled on an eccentric portion of a shaft such that the shaft rotates the rotor 24 to perform orbital revolutions within the rotor cavity 20. The shaft may rotate three times for each complete rotation of the rotor 24 as it moves around the rotor cavity 20. Oil seals are provided around the eccentric to impede leakage flow of lubricating oil radially outwardly thereof between the respective rotor end face 26 and side housings 11. During each rotation of the rotor 24, each chamber 32 varies in volumes and moves around the rotor cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air, an exhaust port 44, and an optional purge port also in communication with the source of air (e.g. a compressor) and located between the inlet and exhaust ports 40, 44. The ports 40, 44 may be defined in the side housings 11 or in the peripheral wall 18. In the embodiment shown, the ports 40, 44 are defined in the peripheral wall 18. Alternate configurations are possible.

In a particular embodiment, fuel such as kerosene (jet fuel) or other suitable fuel is delivered into the chamber 32 through a fuel port (not shown) and a fuel-air mixture may be ignited within the outer body 12 using any suitable ignition system known in the art (e.g. spark plug, glow plug). In a particular embodiment, the rotary engine 10 operates under the principle of the Miller or Atkinson cycle, with its compression ratio lower than its expansion ratio, through appropriate relative location of the primary inlet port 40 and exhaust port 44.

Figure 3:
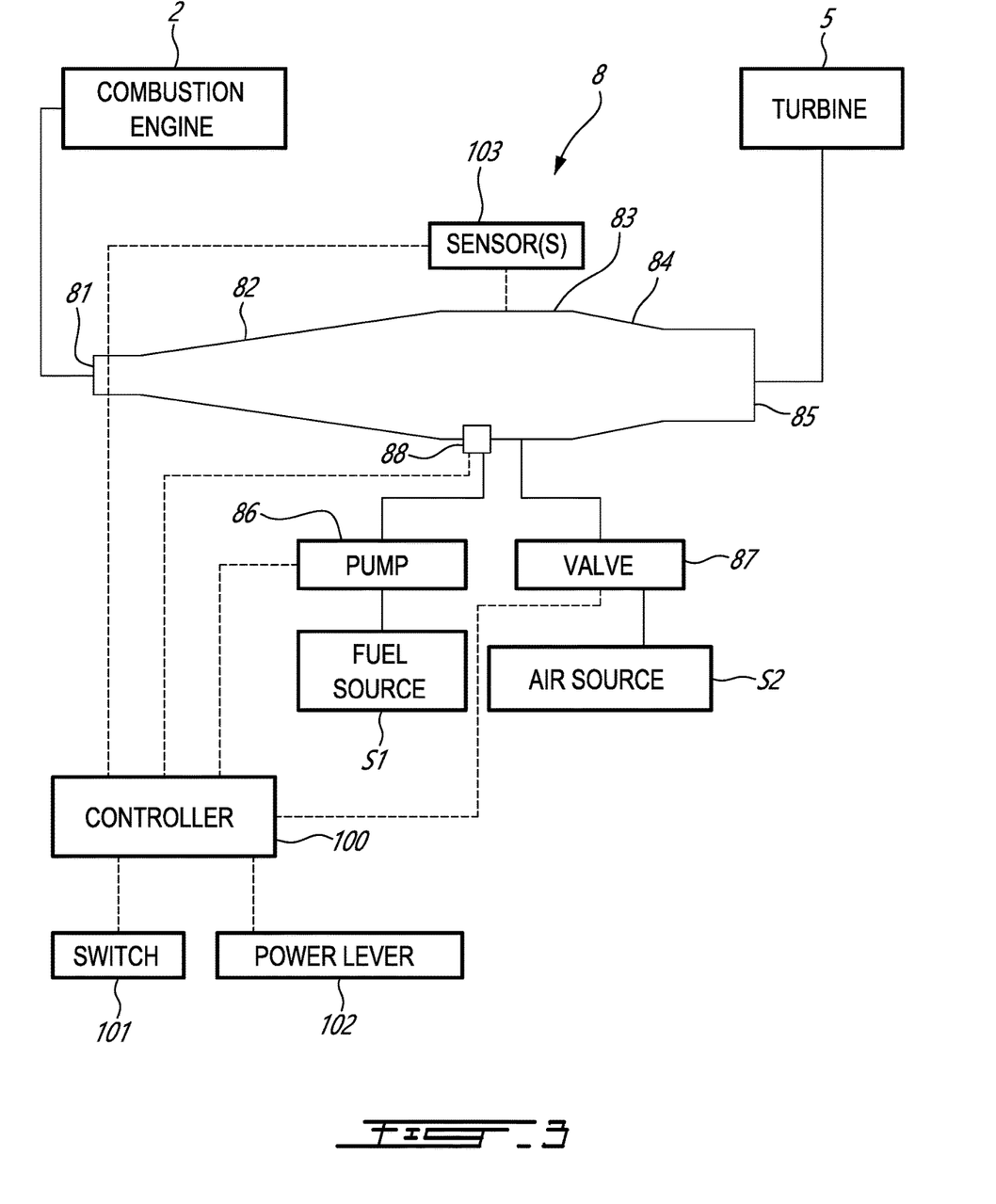
FIG. 3 is a schematic side view of an interburner in accordance with one embodiment that may be used as part of the aircraft power plant of FIG. 1.

Referring now to FIG. 3, the interburner 8 is described below. The interburner 8 includes an inlet 81 fluidly connected to an exhaust of the combustion engine 2. The inlet 81 is fluidly connected to an inlet conduit 82 that leads to a combustion chamber 83. The combustion chamber 83 is fluidly connected to an outlet conduit 84 that leads to an outlet 85 or exhaust of the interburner 8. The outlet 85 of the interburner 8 is fluidly connected to the turbine 5. In the embodiment shown, a flow area of the inlet conduit 82 increases until it connects to the combustion chamber 83. A flow area of the outlet conduit 84 decreases downstream of the combustion chamber 83. The inlet conduit 82 may act as a diffuser to slow down the flow and may have a diameter increasing from about 2 inches to about 4.5 inches away from the inlet 81 to the combustion chamber 83. The outlet conduit 84 may have a diameter decreasing from about 4.5 inches to about 3 inches from the combustion chamber 83 towards the outlet 85. An overall length of the interburner 8 may be about 32.5 inches. The inlet conduit 82 may have a constant cross-sectional area or a decreasing cross-sectional area in some embodiments. The outlet conduit 84 may have a constant cross-sectional area or an increasing cross-sectional area in some embodiments. The lengths of the different sections may be selected based on the mixing process and flame characteristics. Materials used for the interburner 8 are selected in accordance with thermal constraints to which the interburner 8 is exposed to. Herein, the expression "about" implies variations of plus or minus 10%. It will be appreciated that these dimensions are exemplary and that an interburner may be built with other dimensions to satisfy the requirements of where it will be implemented.

The combustion chamber 83 of the interburner 8 is fluidly connected to the fuel source S1 through a second pump 86. The second pump 86 may be operatively connected to the controller 100, as for the pump 9 (FIG. 1), to control a mass flow rate of fuel supplied form the fuel source S1 (e.g., fuel reservoir) to the interburner 8. A fuel injector 88 is fluidly connected to the interburner 8 and to the fuel source S1 via the second pump 86. The fuel injector 88 is operatively connected to the controller 100.

The combustion chamber 83 is also fluidly connected to an air source S2, herein through an air valve 87. In some embodiments, the air source S2 may be the compressor 4 of the aircraft power plant 1. The air valve 87 may therefore be pneumatically connected on a conduit fluidly connecting an outlet of the compressor 4 to the interburner 8 through the air valve 87. The conduit may be connected to the compressor 4 at any other suitable bleed location on said compressor 4. The air valve 87 may be operatively connected to the controller 100 and may be used to control a mass flow rate of air supplied from the air source S2 (e.g., compressor 4) to the interburner 8. Other configurations are contemplated. For instance, the air source S2 may be another compressor, a scoop inlet, and so on. In some embodiments, no additional air is injected into the interburner 8 since, as will be discussed below, enough air may already be present in the combustion gases exiting the combustion engine 2. The air valve 87 may be omitted in some configurations.

In the embodiment shown, the combustion engine 2 of the aircraft power plant 1, which may correspond to the rotary engine 10, may be operated with different type of combustion schemes. Amongst one of them, the direct injection with diffusion combustion promotes the usage of a lambda (λ) value above 1. The lambda is referred to as the air-fuel equivalence ratio and is a ratio of the actual air-fuel ratio to the stoichiometric air-fuel ratio. The lambda is defined as follows:

$$\lambda = \frac{AFR}{AFR_{stoich}}$$

$$AFR(\text{air fuel ratio}) = \frac{m_{air}}{m_{fuel}}$$

Where $m_{air}$ and $m_{fuel}$ are the mass flow rate of air and the mass flow rate of fuel, respectively. Thus, the air-fuel equivalence ratio is derived by dividing a ratio of an actual mass flow rate of air supplied to the combustion engine 2 to an actual mass flow rate of fuel supplied to the combustion engine 2 by a stoichiometric ratio of a mass flow rate of air to a mass flow rate of fuel required to obtain a stoichiometric reaction of combustion in which there is no excess of air and no excess of fuel. Typically, the rotary engine 10 is operated with a lambda above 1. This means that more oxygen is supplied to the combustion chambers of the rotary engine 10 than necessary for combustion of the fuel injected into those combustion chambers. This may also be referred to as a "lean" mixture.

The excess of unburned oxygen in the exhaust gases exiting the rotary engine 10 may allow for the addition of the interburner 8. The interburner 8 may allow for oxidation of excess air by the injection of fuel downstream of the rotary engine 10 and upstream of the turbine 5. This may result in an increase of a temperature of the exhaust gas thereby allowing more work extraction from the turbine 5. Since the aircraft power plant 1 is turbocompounded, more power may be transferred from the turbine 5 to the shaft 3, herein via the gearbox 6. Hence, for the same level of work output, the size of the core (e.g., rotary engine 10, turbine 5) may be reduced with the usage of the interburner 8. This may allow the aircraft power plant 1 to generate sufficient power for most operating conditions (e.g., cruise) with the interburner turned off and to generate sufficient power when higher power is required (e.g., take-off) with the interburner turned on. Thus, the combustion engine 2 may be sized so as to be able to satisfy a power requirement of most operating conditions instead of being sized to satisfy the most extreme power requirements. Weight and efficiency gains may be possible with the disclosed aircraft power plant 1.

As explained above, the interburner 8 may improve a power density of the aircraft power plant 1 and the specific fuel consumption of said power plant. However, when an extra boost of power is requested, the interburner 8 has to be ignited. That is, a mixture of air and fuel injected into the interburner 8 has to be ignited. To do so, an igniter (e.g., spark plug, glow plug, etc) may be used, but this add weight and complexity to the aircraft power plant 1. The present disclosure describes a method of igniting the interburner 8 without the use of an igniter. Thus, the interburner 8 may be free of an igniter. In other words, the interburner 8 is devoid of an igniter.

In the embodiment shown, the method of igniting the interburner 8 includes temporarily decreasing the air-fuel equivalence ratio, λ, with the results of increasing a temperature of combustion gases exiting the rotary engine 10 above a temperature threshold required for self-ignition.

For an engine working in a diffusion type combustion, λ is always above 1, with different level of excess air. This excess air may allow the usage of the interburner 8 as unburned oxygen is still available to complete oxidation of additional fuel. Hence, reducing the λ value may still allow for efficient combustion within the rotary core while promoting higher exhaust gas temperature that may result in self-ignition of the fuel injected within the interburner 8. This may effectively remove the need for the igniter.

Figure 4:
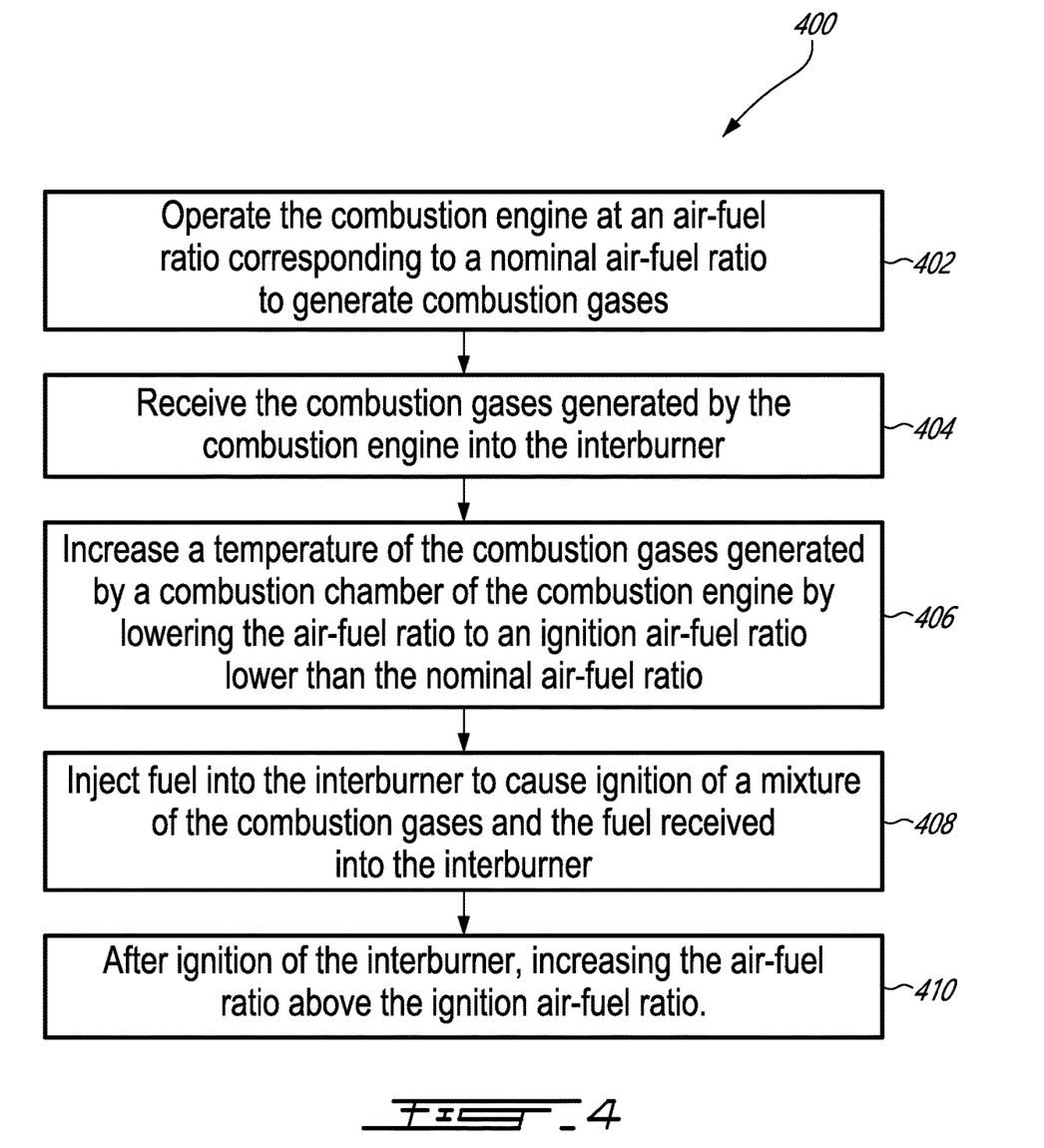
FIG. 4 is a flowchart illustrating steps of a method of operating the aircraft power plant of FIG. 1.

Referring now to FIG. 4, a method of operating the aircraft power plant 1 is shown at 400. The method 400 includes operating the combustion engine 2 at an air-fuel ratio, which may correspond to an air-fuel equivalence ratio (λ), corresponding to a nominal air-fuel ratio to generate combustion gases at 402; receiving the combustion gases generated by the combustion engine 2 into the interburner 8 at 404; increasing a temperature of the combustion gases generated by a combustion chamber of the combustion engine 2 by lowering the air-fuel ratio to an ignition air-fuel ratio lower than the nominal air-fuel ratio at 406; injecting fuel into the interburner 8 to cause ignition of a mixture of the combustion gases and the fuel received into the interburner 8 at 408; and, after ignition of the interburner 8, increasing the air-fuel ratio above the ignition air-fuel equivalence ratio at 410.

In the embodiment shown, the lowering of the air-fuel ratio includes increasing a mass flow rate of a fuel supplied to the combustion engine 2. This may be done by controlling the pump 9 (FIG. 1) that fluidly connects the fuel source S1 to the combustion engine 2. This may allow for a greater power output for the aircraft power plant 1. The lowering of the air-fuel ratio may include decreasing a mass flow rate of air supplied to the combustion engine. This may lower the power output. Any combination of the increasing of the mass flow rate of the fuel and the decreasing of the mass flow rate of the air is contemplated. This may maintain the same power output, depending on the rate at which the flows are changed. The increasing of the air-fuel ratio at 410 may include resuming operating the combustion engine 2 back to the nominal air-fuel equivalence ratio. Alternatively, the air-fuel ratio may be above or below the nominal air-fuel ratio. Having the air-fuel ratio above the nominal air-fuel ratio may provide more air in the interburner. In turn, this may allow more fuel to be injected in the interburner 8 to further increase the temperature rise.

In the present embodiment, the operating of the combustion engine 2 at 402 includes supplying air to the combustion engine 2 via the compressor 4. The decreasing of the mass flow rate of the air may include bleeding compressed air out of the compressor 4 via the blow off valve 4B. The controller 100 may send a signal to the blow off valve 4B such that the blow off valve 4B moves from a closed configuration to an open configuration to bleed air out of the compressor 4. The controller 100 may be operatively connected to the actuator of the VGVs 4A to pivot the VGVs 4A. The decreasing of the mass flow rate of the air may include changing an angle of attack of the guide vanes 4A of the compressor 4 by pivoting the VGVs 4A to a position in which a mass flow air of air entering the compressor 4 is decreased. The decreasing of the mass flow rate of the air may include decreasing a speed of rotation of a rotor of the compressor 4. This may be done by changing a gear ratio between the combustion engine 2/turbine 5 and the compressor 4 via the gearbox 6. The controller 100 may send a signal to the gearbox 6 to change this gear ratio. Any suitable ways may be used to change this gear ratio (e.g., clutches, planetary gear trains, etc). Any combinations of the above are contemplated.

In the embodiment shown, the lowering of the air-fuel ratio at 406 occurs in response to receiving of a command from the controller 100. The receiving of the command may include receiving a signal from a switch 101 (FIG. 3) operatively connected to the controller 100. The controller 100 is operatively connected to the aircraft power plant 1. Alternatively, the receiving of the command may include receiving a signal from a power lever 102 (FIG. 3) operatively connected to the controller 100 of the aircraft power plant 1. The signal is indicative that a power requirement of the aircraft power plant 1 is above a power threshold of the aircraft power plant 1 when the interburner 8 is turned off. In other words, the power lever 102 may be gradated from 0 to 100% of a maximum power of the aircraft power plant 1. In some embodiments, the maximum power may be achieved solely with the help of the interburner 8. Therefore, when a position of the power lever 102 is beyond a certain value (e.g., 80% of the maximum power), the controller 100 triggers the ignition of the interburner 8 since the aircraft power plant 1 may not be able to reach more than 80% of its maximum power without the interburner 8.

The method 400 may include determining that the interburner 8 is ignited before proceeding to the step 410 of the increasing of the air-fuel ratio. To do so, one or more sensor(s) 103 (FIG. 3) may be operatively connected to the interburner 8. The one or more sensor(s) 103 may include, for instance, a temperature sensor. The controller 100 may be operatively connected to the temperature sensor and able to receive a signal from said sensor; the signal indicative that a temperature is above a temperature threshold indicative that the interburner 8 is ignited. Alternatively, or in combination, an increase in the power generated by the aircraft power plant 1 may be indicative that the interburner 8 is ignited. Such an increase in power may be determined by determining that an aircraft equipped with the aircraft power plant 1 has accelerated; a torque sensor on the shaft 3 of the combustion engine 2 may provide an indication that an increase in power occurred. Any suitable ways of determining that the interburner 8 is ignited are contemplated.

In some embodiments, enough air is present in the combustion gases exiting the combustion engine 2 that it may not be required to inject more air in the interburner 8. In other words, operation of the interburner 8 may be done without any additional injection of air. However, in some configurations, it may be possible to inject more air into the interburner 8.

Figure 5:
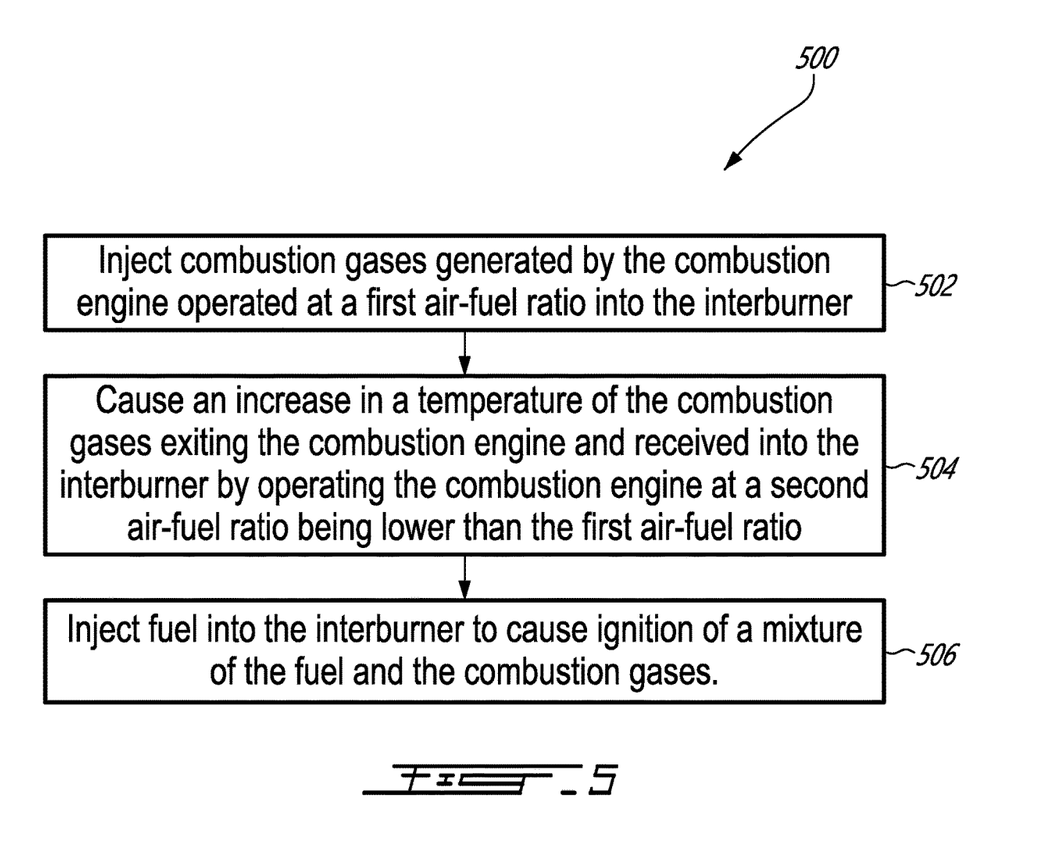
FIG. 5 is a flowchart illustrating steps of a method of igniting the interburner of FIG. 3.

Referring now to FIG. 5, a method of igniting the interburner 8 is shown at 500. The method 500 includes injecting combustion gases generated by the combustion engine 2 operated at a first air-fuel ratio into the interburner 8 at 502; causing an increase in a temperature of the combustion gases exiting the combustion engine 2 and received into the interburner 8 by operating the combustion engine 2 at a second air-fuel ratio being lower than the first air-fuel ratio at 504; and injecting fuel into the interburner 8 to cause ignition of a mixture of the fuel and the combustion gases at 506.

In the embodiment shown, the operating of the combustion engine 2 at the second air-fuel ratio includes one or more of increasing a mass flow rate of a fuel to the combustion engine 2 and decreasing a mass flow rate of air to the combustion engine 2.

As described above, the method 500 may include supplying air to the combustion engine 2 via the compressor 4. The decreasing of the mass flow rate of the air may include bleeding compressed air out of the compressor 4 via the blow off valve 4B. The decreasing of the mass flow rate of the air may include changing an angle of attack of guide vanes 4A of the compressor 4. The decreasing of the mass flow rate of the air may include decreasing a speed of rotation of a rotor of the compressor 4. Any suitable combinations of the above are contemplated.

Figure 6:
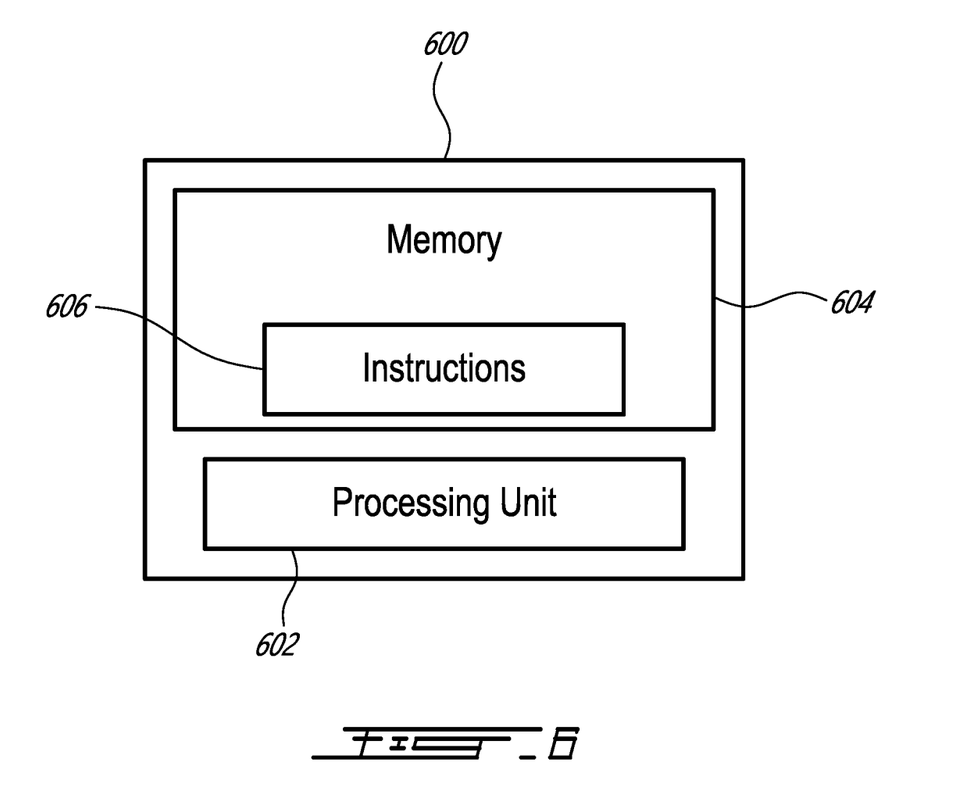
FIG. 6 is a schematic representation of a controller of the aircraft power plant of FIG. 1.

With reference to FIG. 6, an example of a computing device 600 is illustrated. For simplicity only one computing device 600 is shown but the system may include more computing devices 600 operable to exchange data. The computing devices 600 may be the same or different types of devices. The controller 100 may be implemented with one or more computing devices 600. Note that the controller 100 can be implemented as part of a full-authority digital engine controls (FADEC) or other similar device, including electronic engine control (EEC), engine control unit (ECU), electronic propeller control, propeller control unit, and the like. In some embodiments, the controller 100 is implemented as a Flight Data Acquisition Storage and Transmission system, such as a FAST™ system. The controller 100 may be implemented in part in the FAST™ system and in part in the EEC. Other embodiments may also apply.

The computing device 600 comprises a processing unit 602 and a memory 604 which has stored therein computer-executable instructions 606. The processing unit 602 may comprise any suitable devices configured to implement the methods 400, 500 such that instructions 606, when executed by the computing device 600 or other programmable apparatus, may cause the functions/acts/steps performed as part of the method 400, 500 as described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

The methods and systems for igniting the interburner described herein may be implemented in a high level procedural or object oriented programming or scripting language, or a combination thereof, to communicate with or assist in the operation of a computer system, for example the computing device 600. Alternatively, the methods and systems for igniting the interburner may be implemented in assembly or machine language. The language may be a compiled or interpreted language. Program code for implementing the methods and systems for igniting the interburner may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for igniting the interburner may also be considered to be implemented by way of a non-transitory computer-readable storage medium having a computer program stored thereon. The computer program may comprise computer-readable instructions which cause a computer, or more specifically the processing unit 602 of the computing device 600, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology.

Yet further modifications could be implemented by a person of ordinary skill in the art in view of the present disclosure, which modifications would be within the scope of the present technology.

The invention claimed is:

1. A method of operating an aircraft power plant having an interburner fluidly connected between a combustion engine and a turbine, comprising:
   operating the combustion engine at an air-fuel ratio corresponding to a nominal air-fuel ratio to generate combustion gases at a nominal temperature;
   receiving the combustion gases generated by the combustion engine into the interburner;
   increasing a temperature of the combustion gases generated by a combustion chamber of the combustion engine from the nominal temperature to an ignition temperature by lowering the air-fuel ratio to an ignition air-fuel ratio lower than the nominal air-fuel ratio;
   injecting a fuel into the interburner and igniting a mixture of the combustion gases and the fuel received into the interburner with the combustion gases being at the ignition temperature; and
   after the ignition of the mixture of the combustion gases and the fuel received into the interburner, increasing the air-fuel ratio above the ignition air-fuel ratio.

2. The method of claim 1, wherein the lowering of the air-fuel ratio includes increasing a mass flow rate of a fuel supplied to the combustion engine.

3. The method of claim 1, wherein the lowering of the air-fuel ratio includes decreasing a mass flow rate of an air supplied to the combustion engine.

4. The method of claim 3, wherein the operating of the combustion engine includes supplying the air to the combustion engine via a compressor.

5. The method of claim 4, wherein the decreasing of the mass flow rate of the air includes bleeding compressed air out of the compressor.

6. The method of claim 4, wherein the decreasing of the mass flow rate of the air includes changing an angle of attack of guide vanes of the compressor.

7. The method of claim 4, wherein the decreasing of the mass flow rate of the air includes decreasing a speed of rotation of a rotor of the compressor.

8. The method of claim 1, wherein the increasing of the air-fuel ratio includes resuming operating the combustion engine back to the nominal air-fuel ratio.

9. The method of claim 1, wherein the air-fuel ratio is an air-fuel equivalence ratio ($\lambda$).

10. A method of igniting an interburner of an aircraft power plant without an igniter, the interburner fluidly connected between a combustion engine and a turbine of the aircraft power plant, comprising:
    Injecting combustion gases generated by the combustion engine operated at a first air-fuel ratio into the interburner, the combustion gases being at a nominal temperature;
    Causing an increase in a temperature of the combustion gases exiting the combustion engine and received into the interburner from the nominal temperature to an ignition temperature by operating the combustion engine at a second air-fuel ratio being lower than the first air-fuel ratio; and
    injecting a fuel into the interburner and igniting a mixture of the fuel and the combustion gases with the combustion gases being at the ignition temperature.

11. The method of claim 10, wherein the operating of the combustion engine at the second air-fuel ratio includes one or more of increasing a mass flow rate of a fuel to the combustion engine and decreasing a mass flow rate of an air to the combustion engine.

12. The method of claim 11, comprising supplying the air to the combustion engine via a compressor.

13. The method of claim 12, wherein the decreasing of the mass flow rate of the air includes bleeding compressed air out of the compressor.

14. The method of claim 12, wherein the decreasing of the mass flow rate of the air includes changing an angle of attack of guide vanes of the compressor.

15. The method of claim 12, wherein the decreasing of the mass flow rate of the air includes decreasing a speed of rotation of a rotor of the compressor.

16. An aircraft power plant, comprising:
a combustion engine;
a turbine;
an interburner having an interburner inlet fluidly connected to an exhaust of the combustion engine and an interburner outlet fluidly connected to a turbine inlet of the turbine;
a fuel injector fluidly connected to the interburner; and
a controller operatively connected to the combustion engine and to the fuel injector, the controller configured to:
  operate the combustion engine at an air-fuel ratio corresponding to a nominal air-fuel ratio to generate combustion gases;
  in response to receiving of a command, lower the air-fuel ratio of the combustion engine to increase a temperature of the combustion gases exiting a combustion chamber of the combustion engine and received within the interburner, including receiving a signal from a power lever of the aircraft power plant, the signal indicative that a power requirement of the aircraft power plant is above a power threshold of the aircraft power plant when the interburner is turned off;
  inject a fuel into the interburner to cause ignition of a mixture of the combustion gases and the fuel received into the interburner; and
  after ignition of the mixture of the combustion gases and the fuel received into the interburner, increase the air-fuel ratio.

17. The aircraft power plant of claim 16, wherein the controller is configured to lower the air-fuel ratio by one or more of increasing a mass flow rate of a fuel supplied to the combustion engine and decreasing a mass flow rate of an air supplied to the combustion engine.

18. The aircraft power plant of claim 17, comprising a compressor fluidly connected to the combustion engine, the controller configured to lower the air-fuel ratio by one or more of:
decreasing the mass flow rate of the air by bleeding compressed air out of the compressor,
decreasing the mass flow rate of the air by changing an angle of attack of guide vanes of the compressor, and
decreasing the mass flow rate of the air by decreasing a speed of rotation of a rotor of the compressor.

19. The aircraft power plant of claim 16, wherein the controller is configured to receive the command by receiving a signal from a switch operatively connected to the controller, the controller operatively connected to the aircraft power plant.

* * * * *